Patented Apr. 30, 1935

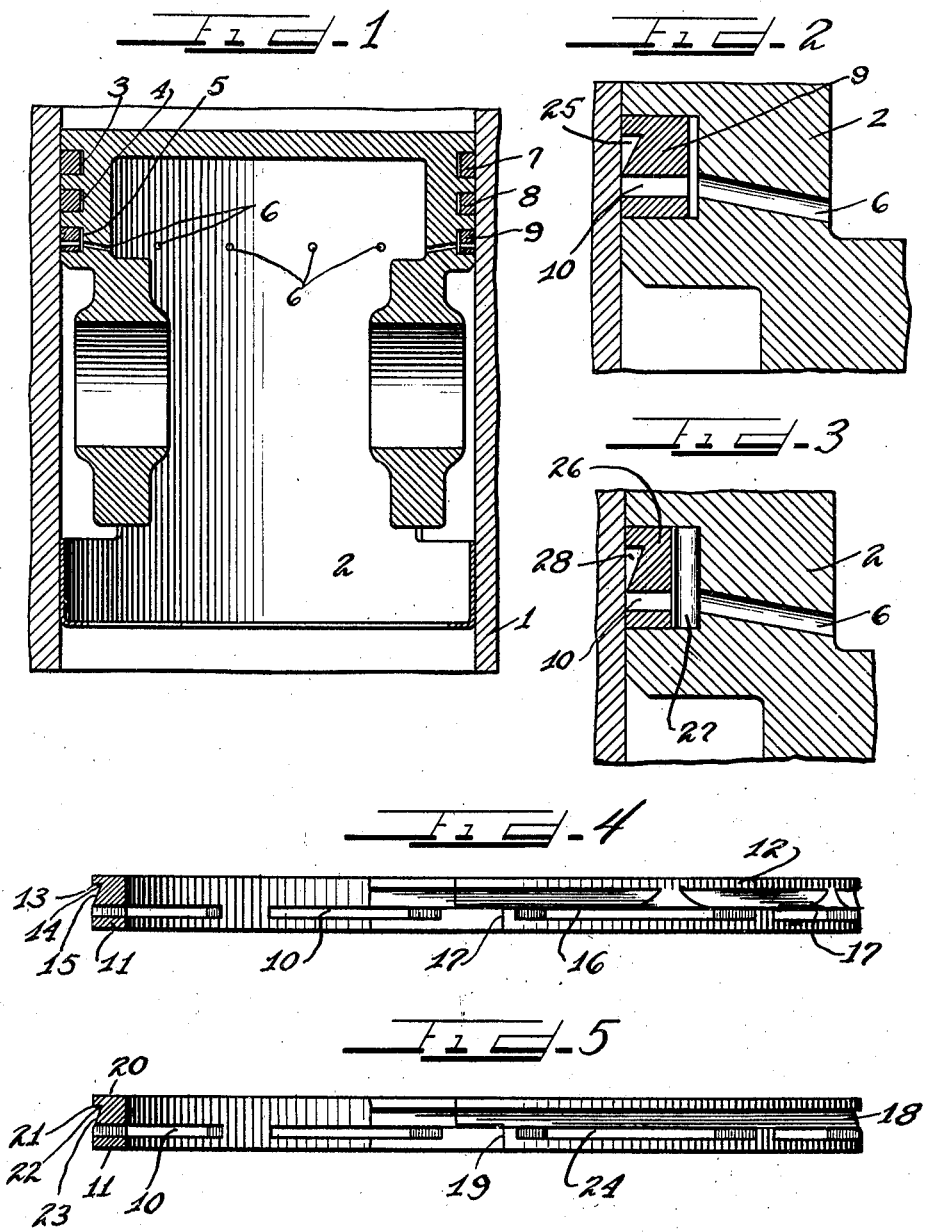

1,999,233

UNITED STATES PATENT OFFICE 1,999,233

PISTON RING

Albert P. Fall, Toledo, Ohio

Application November 19, 1931, Serial No. 576,090

7 Claims. (Cl. 309—45)

The present invention relates to piston rings and particularly to rings for internal combustion engines of the oil regulating type for effectively removing excess lubricant from the cylinder wall and also for preventing oil pumping.

An object of the present invention is to provide a piston ring so constructed as to provide a positive seal between the piston and cylinder thereby eliminating excess oil consumption at all speeds.

Another object of the invention is to provide a piston ring having a vertically separated groove and slot construction whereby oil may be trapped in a groove on one stroke of the piston and passed through the slot in another stroke of the piston.

A further object of the invention is to provide a piston ring having an edge effective for scraping action on the downstroke and another edge effective for scraping action on the upstroke whereby excess oil may be gathered and eventually drained thereby affording improved lubrication.

A still further object of the invention is to provide a piston ring having a groove for collecting therein oil on downstroke and thus effectively lubricating the relatively movable parts.

Another and yet further object of the invention is to provide a piston ring having a plurality of bearing surfaces for engaging the cylinder wall thus insuring a uniform pressure against the cylinder wall and lengthening the life of the ring.

Another and still further object of the invention is to provide a piston ring so constructed with grooves and openings as to maintain proper wall tension in service.

Another and further object of the invention is to provide an oil regulating ring having drain openings through the same arranged near the bottom of the ring and a groove or recess above the openings for accumulating excess lubricant.

Another object of the invention is to provide a piston ring having a single series of elongated slots extending through the ring and disposed near the bottom thereof together with a recess above some of the slots for accumulating therein excess lubricant, the ring being so constructed as to reduce the cylinder contacting surfaces to minimum area and at the same time capable of exerting substantially uniform pressure against the cylinder wall throughout the circumference of the ring.

The above, other, and further objects of the invention will be apparent from the following description, accompanying drawing, and appended claims.

Embodiments of the invention are illustrated in the accompanying drawing and the views thereof are as follows:

Figure 1 is a vertical sectional view illustrating a fragmental portion of a cylinder with a piston therein which is supplied with a ring embodying principles of the present invention.

Figure 2 is a fragmental enlarged vertical sectional view through a portion of a cylinder, a piston, and a ring embodying principles of the present invention.

Figure 3 is a view similar to Figure 2 showing a ring reduced in radial thickness and installed in a piston groove with an expander or inner spring.

Figure 4 is an elevational view, partially in section, of a piston ring embodying principles of the present invention.

Figure 5 is a view similar to Fig. 4 showing another embodiment of the present invention.

The piston rings of the present invention are particularly for service in connection with internal combustion engines although of course such rings may be used with other prime movers and accordingly are not to be restricted to internal combustion engines.

The drawing will now be explained.

An engine cylinder 1 is shown having a piston 2 reciprocable therein. The piston is provided with, in the present instance, three ring grooves 3, 4, and 5 for the reception of piston rings as is common practice.

The lowermost ring groove 5 is provided with a plurality of openings 6 extending from the rear portion of the groove and opening to the interior of the piston and serving as drains for lubricant in the ring groove 5.

Installed in the grooves 3 and 4 are conventional piston rings 7 and 8, while installed in the groove 5 is a piston ring 9 embodying principles of the present invention.

The ring 9 installed in the groove 5 of the piston 2 may be the form illustrated in Figure 4 or the form illustrated in Figure 5.

Referring to the ring illustrated in Figure 4 it will be observed that the ring is provided with a single series of circumferentially spaced slots 10 disposed nearer the bottom face 11 of the ring. These slots are preferably wider at the outer portion than the inner due to the manufacturing process. Above the series of slots 10 appear a plurality of circumferentially spaced recesses or grooves 12 formed by undercutting the ring in the outer surface thereof providing a shoulder or scraping edge 13, an upper wall 14 of the recess or groove and an inclined wall 15. The walls 15 incline downwardly and outwardly terminating in an edge 16 which may lie in the surface of the cylinder wall contacting portions of the ring. The edge 16 is at substantially mid-height of the ring. The grooves or recesses 12 at the split 17 are not closed adjacent such slit but are open to it so that when the ring is in place in the ring groove and the split ends are in overlapping relation as illustrated in Figure 4, the recess in one end of the ring at the split will open into and communicate with the recess in the other end adjacent the split thus forming a continuous groove across the split. The spaces, recesses or grooves 12 are separated by bridges 17 formed by a suitable tool when the recesses are made.

The edge 16 may be coincident with the cylinder wall engaging surfaces of the ring or may be slightly less. In any event this edge is fine and under conditions of use lubricant passes over this edge from a recess to a slot or opening.

The ring illustrated in Figure 5 is provided with a similar series of circumferentially spaced openings or slots 10 formed in the ring nearer the bottom surface or face 11 of the same. Above the openings 10 is formed a continuous groove or recess 18 open at the ends adjacent the split 19 to form in effect a continuous groove or recess about the outer face of the ring and nearer the upper surface 20 of the same. The groove or recess is formed by undercutting providing a scraping edge 21, a substantially horizontal top wall 22 and an inclined side wall 23 the latter being inclined downwardly and outwardly and terminating in an edge 24 which may be slightly less in diameter than the cylinder wall engaging portions of the ring such for instance as the scraping edge 21.

Figure 2 illustrates a fragmental portion of a piston 2 with a ring 9 therein embodying principles of the present invention and showing an opening 10 through the ring communicating with an oil drain passage 6 formed in the piston. Above the opening 10 is a recess or groove designated at 25 which may be a portion of the continuous groove 18 of the ring of Figure 5 or a portion of one of the grooves 12 of the ring of Figure 4.

Figure 3 illustrates a fragmental portion of a piston 2 having a ring 26 therein embodying principles of the present invention but reduced in radial thickness to allow the installation of an expander or inner spring 27 between the inner surface of the ring and the rear wall of the groove. Oil drain passages 6 are provided and also the ring 26 is provided with openings 10 for oil drain purposes and a recess 28 which may be of the character of the recesses 12 of the rings 4 or 5.

In operation a ring constructed in accordance with the principles of the present invention will on the downstroke of the piston scrape surplus oil on the cylinder wall into the groove or recess or beveled channel by reason of the scraper edges 13 or 21. On the upstroke the oil drains down on the beveled inclined walls 15 or 23 and is distributed on the cylinder wall uniformly thus giving perfect lubrication. Any excess lubricant or oil that there may be passes down about the reduced circumferential diameter of the edge 24 or 16 into the openings 10 thence rearwardly through the ring into the piston ring groove 5 and subsequently through the drain ports 6 to the crankcase.

It will be observed that use of rings embodying the present invention is such as to collect excess oil in the beveled channels on the downstroke of the piston and to drain excess oil into the openings below such channels for return to the crankcase through the holes in the piston leading from the piston ring grooves.

The provision of the beveled channels affords constant lubrication at all points on the cylinder wall without obstructing any part of the ring so that perfect lubrication is effected.

Removal of the metal to provide the beveled channels or recesses and the slots removes a sufficient amount of metal from the ring whereby the ring instantly seats after installation in a piston ring groove in a piston.

The provision of the bridges 17 in the form of ring illustrated in Figure 4 is proportioned to divide the ring equally as to the beveled channels so that uniformity of pressure on all portions of the cylinder wall is maintained and at the same time affording sufficient wearing surfaces in the ring to prolong the life of the same.

Rings constructed in accordance with the present invention do not have the wall tension thereof reduced even though large quantities of metal be cut away from the face of the ring in forming the rings of the present invention.

The provision of the two scraping edges for picking up excess oil in addition to the oil or lubricant in the beveled channel together with the escape of excess oil through the openings of the ring vent to the crankcase affords a positive seal between the piston ring and cylinder wall and eliminates excessive oil consumption at all speeds and at the same time creates an oil film between the cylinder wall and face of the piston ring that assures constant lubrication.

Rings of the present invention may be used with or without expanders or inner rings. If used with expanders then the radial thickness of the rings will be reduced slightly to accommodate the insertion of the expanders behind the piston rings in the piston ring grooves.

The advantage of disposing the beveled channels or oil collecting recesses or grooves above the openings is that better lubrication is assured and collection of excess oil is accelerated, thus preventing oil pumping and increasing the efficiency of the internal combustion engine.

The top and bottom surfaces of the openings 10 are parallel whereas the end portions of these openings converge inwardly.

When the ring is constructed as illustrated in Figure 4 the channels and openings are so arranged relatively to one another that a recess or channel communicates with one or more of the openings through the ring.

The edge 16 cuts through the film of oil on the cylinder wall.

The invention has been described herein more or less precisely as to details yet it is to be understood that the invention is not to be limited thereby, as changes may be made in the arrangement and proportion of parts and that equivalents may be substituted without departing from the spirit and scope of the invention.

The invention is claimed as follows:

1. A piston ring having an undercut recess formed in the outer surface thereof near the upper face of the ring, the top surface of the undercut recess providing a scraping edge for the downstroke of the ring in service, said ring having a series of elongated openings therethrough below said recess, the lower portions of said openings constituting scraping edges on the upstroke of the ring in service, said recess having a downwardly and outwardly extending side wall which merges into that portion of the ring forming the tops of said openings, said recess and openings being out of communication for oil interchange except over the edge of said recess side wall.

2. An axially rigid piston ring having upper and lower faces and having an imperforate circumferentially extending groove in its outer periphery undercut therein and spaced below the upper face of the ring, said ring having a plurality of circumferentially spaced radial openings of uniform height and shape therethrough below said groove, said openings opening through the outer surface of said ring above its lower face, the lower surface of said groove being downwardly inclined and lying immediately above said openings, and the upper surface of said groove being below and parallel to the upper face of the ring.

3. An axially rigid piston ring having upper and lower faces and having a circumferentially extending groove in its outer periphery undercut therein and spaced below and near the upper face of the ring, the lower surface of said groove being downwardly inclined and merging with the outer periphery of said ring at substantially mid-height thereof, said ring having a plurality of circumferentially spaced radial openings therethrough below said groove and opening through the outer surface of said ring above its lower face, the outer edge of the upper surface of said groove providing a scraping edge active on down stroke, and the portions of the ring circumferentially spacing said openings and the portions of the ring below said openings lying in the outer periphery of the ring.

4. An axially rigid piston ring having a circumferentially extending groove undercut in its periphery below the top face of the ring, the outer edge of the top surface of said groove providing a scraping edge active on down stroke, the lower surface of said groove being inclined downwardly, and said ring having a plurality of elongated circumferentially spaced radial openings therethrough immediately below the lower edge of said inclined groove surface, said openings lying above the bottom face of said ring, and a part of the outer ring face below said openings adapted to contact the cylinder wall.

5. A piston ring having an undercut recess or groove in its outer surface below the top face of the ring, the outer edge of the top surface of said recess or groove providing a scraping edge active on down stroke, the lower surface of said recess or groove being downwardly inclined, said ring having circumferentially spaced openings therethrough below said inclined surface of said groove, the portions of the ring spacing said openings lying in the outer surface of the ring and bridging the ring between the lower part thereof and said inclined surface of the groove or recess, and the margin of the inclined surface except for its connection with said bridging portions being of less diameter than the diameter of the outer surface of the ring for oil interchange between said recess or groove and said openings.

6. A piston ring comprising a resilient split band having a plurality of slits extending radially therethrough and separated by bridge portions connecting the upper and lower portions of the band, the said band also being provided with a circumferentially extending groove having a downwardly and outwardly inclined beveled face merging into said slits.

7. A piston ring comprising a resilient split band having a plurality of slits extending radially therethrough and separated by bridge portions connecting the upper and lower portions of the band, the said band also being provided with a single series of circumferentially spaced imperforate grooves lying below the top face of the ring and each having a downwardly and outwardly inclined face merging into said slits, the toe of said beveled face being adapted to be out of contact with the cylinder wall for oil interchange between said grooves and said slits in service.

ALBERT P. FALL.